United States Patent
Morin

(10) Patent No.: US 10,186,983 B2
(45) Date of Patent: Jan. 22, 2019

(54) IDEAL DIODE BRIDGE RECTIFYING CIRCUIT AND CONTROL METHOD

(71) Applicant: TELCODIUM INC., Boucherville (CA)

(72) Inventor: Eric Morin, Longueuil (CA)

(73) Assignee: TELCODIUM INC., Boucherville (CA)

( * ) Notice: Subject to any disclaimer, the term of this patent is extended or adjusted under 35 U.S.C. 154(b) by 0 days.

(21) Appl. No.: 15/565,982

(22) PCT Filed: Apr. 13, 2016

(86) PCT No.: PCT/CA2016/050428
§ 371 (c)(1),
(2) Date: Oct. 12, 2017

(87) PCT Pub. No.: WO2016/165017
PCT Pub. Date: Oct. 20, 2016

(65) Prior Publication Data
US 2018/0097451 A1    Apr. 5, 2018

Related U.S. Application Data

(60) Provisional application No. 62/146,462, filed on Apr. 13, 2015.

(51) Int. Cl.
*H02M 7/219* (2006.01)
*H02M 1/08* (2006.01)
(Continued)

(52) U.S. Cl.
CPC ............. *H02M 7/219* (2013.01); *H02M 1/08* (2013.01); *H02M 7/06* (2013.01); *H02M 2001/0009* (2013.01)

(58) Field of Classification Search
CPC .......... H02M 7/219; H02M 1/08; H02M 7/06; H02M 2001/0009
See application file for complete search history.

(56) References Cited

U.S. PATENT DOCUMENTS 5,153,453 A   10/1992   Walters
5,510,972 A   4/1996   Wong
(Continued)

OTHER PUBLICATIONS

Sevel. Billy; "MOSFETs: Increased Efficiency in Bridge Rectifiers"; Jun. 7, 2007; EDN Network; 3 pages.*

(Continued)

*Primary Examiner* — Emily P Pham
(74) *Attorney, Agent, or Firm* — Norton Rose Fulbright Canada LLP

(57) ABSTRACT

There is described a rectifying circuit and method of control thereof. The circuit comprises four ideal diode elements connected in a bridge configuration; four driver units, each one of the driver units connected to a corresponding one of the ideal diode elements and configured to drive the corresponding one of the ideal diode elements; and a controller connected to the driver units and configured for: acquiring a current measurement flowing across the load and a phase measurement of the source; determining, from the current measurement and the phase measurement, corresponding conducting settings for the four ideal diode elements; and outputting at least one control signal to cause the driver units to drive the ideal diode elements in accordance with the conducting settings.

16 Claims, 6 Drawing Sheets

(51) Int. Cl.
*H02M 7/06* (2006.01)
*H02M 1/00* (2006.01)

(56) References Cited

U.S. PATENT DOCUMENTS

| | | | | |
|---|---|---|---|---|
| 5,654,880 | A * | 8/1997 | Brkovic | H02M 1/4258 363/132 |
| 7,269,038 | B2 * | 9/2007 | Shekhawat | H02M 1/42 363/71 |
| 8,207,779 | B2 | 6/2012 | Hu et al. | |
| 8,421,118 | B2 | 4/2013 | Ankoudinov et al. | |
| 8,576,589 | B2 * | 11/2013 | Melanson | H02J 7/0054 323/207 |
| 8,614,874 | B2 * | 12/2013 | Sells | H02M 7/219 361/246 |
| 8,804,389 | B2 * | 8/2014 | Heath | H02M 1/38 363/127 |
| 8,924,170 | B2 | 12/2014 | Bengtsson et al. | |
| 8,942,018 | B2 | 1/2015 | Ho et al. | |
| 9,577,546 | B2 * | 2/2017 | Teren | H02M 7/219 |
| 2007/0046369 | A1 | 3/2007 | Schober et al. | |
| 2007/0116487 | A1 * | 5/2007 | Takahashi | G03G 15/5004 399/88 |
| 2012/0155134 | A1 * | 6/2012 | Kim | H02J 5/005 363/84 |
| 2012/0306284 | A1 | 12/2012 | Lee et al. | |
| 2013/0176758 | A1 * | 7/2013 | Tseng | H02M 7/219 363/89 |
| 2013/0235630 | A1 * | 9/2013 | Sadwick | H02M 3/335 363/74 |
| 2014/0028196 | A1 * | 1/2014 | Takikita | H05B 37/02 315/130 |
| 2014/0119064 | A1 | 5/2014 | Seok | |
| 2015/0003122 | A1 | 1/2015 | Cui et al. | |
| 2016/0261191 | A1 * | 9/2016 | Akram | H02M 3/1588 |
| 2016/0330808 | A1 * | 11/2016 | Brandt | H05B 33/0815 |
| 2017/0251532 | A1 * | 8/2017 | Wang | H05B 33/0815 |

OTHER PUBLICATIONS

Unterdorfer, Pascal; "Power Over Etherner"; Jun. 30, 2008; IEEE 802.3af; pp. 1-10.*
Fairchild GreenBridge™ Solution to Replace Conventional Diode Bridge in Power Over Ethernet Applications; 2012; Fairchild Semiconductor Corporation; pp. 1-4.*
Taranovich, Steve; "Ideal Diode Bridge Controller Efficiently Power MOSFETs"; Jun. 12, 2013; EDN Network; 4 pages.*
International Search Report, 3 pages, dated Jun. 28, 2016, Application No. PCT/CA2016/050428.
Seeman et al., An Ultra-Low-Power Power Management IC for Energy-Scavenged Wireless Sensor Nodes, http://www-power.eecs.berkeley.edu/publications/mseeman_pesc08.pdf, 2008, Section VI, para 1-3 : Section VI, para 1-3.

* cited by examiner

US 10,186,983 B2

IDEAL DIODE BRIDGE RECTIFYING CIRCUIT AND CONTROL METHOD

CROSS REFERENCE TO RELATED APPLICATIONS

The present application is a US National Stage of International Application No. PCT/CA2016/050428, filed on Apr. 13, 2016, which claims priority under 35 U.S.C. 119(e) of U.S. Provisional Patent Application No. 62/146,462 filed on Apr. 13, 2015, the contents of which are hereby incorporated by reference.

TECHNICAL FIELD

The present disclosure relates to designs for power supply units (PSUs).

BACKGROUND OF THE ART

Most switched-mode power supply (SMPS) devices use a full-wave rectifier bridge in the rectifying stage to convert an alternating current (AC) input voltage to a direct current (DC) output voltage. A drawback of the classic four-diode rectifier bridge is the unavoidable forward voltage drop of two diodes when current is flowing. With conventional silicon diodes, this can amount to 1.5 volts or more. The result is wasted power and reduced efficiency. With ideal diode bridge rectifiers using metal-oxide-semiconductor field-effect transistors (MOSFETs), the input voltage cannot exceed the gate-to-source voltage rating of the MOSFETs. This proves undesirable for high voltage applications.

Therefore, there is a need for an improved bridge rectifier design.

SUMMARY

There is disclosed herein a rectifying circuit and method of control thereof. The circuit comprises an ideal diode bridge and control circuitry for controlling the on-off transitions of the ideal diode bridge elements.

In accordance with a first broad aspect, there is provided a rectifying circuit for converting an alternating current (AC) input voltage from a source to a direct current (DC) output voltage for delivery to a load. The circuit comprises four ideal diode elements connected in a bridge configuration. Four driver units are also provided, each one of the driver units connected to a corresponding one of the ideal diode elements and configured to drive the corresponding one of the ideal diode elements. A controller is connected to the driver units and configured for acquiring a current measurement flowing across the load and a phase measurement of the source; determining, from the current measurement and the phase measurement, corresponding conducting settings for the four ideal diode elements; and outputting at least one control signal to cause the driver units to drive the ideal diode elements in accordance with the conducting settings.

In some embodiments, the four ideal diode elements are connected in a full-bridge configuration. In some embodiments, the four ideal diode elements are metal-oxide-semiconductor field-effect transistors (MOSFETs). In some embodiments, the MOSFETs are Gallium Nitride MOSFETs.

In some embodiments, the circuit further comprises four resistors R1, R2, R3, R4, each one of the four resistors connected to a drain of a corresponding one of the MOSFETs.

In some embodiments, the controller comprises a processor connected to the driver units; a phase detector connected to a voltage divider formed from R1 and R2, and a voltage divider formed from R3 and R4, and connected to the processor; a resistor Rsense in a path between the load and the source; and a current to voltage converter connected across the resistor Rsense and to the processor.

In some embodiments, the circuit further comprises an auxiliary power generation unit for powering the controller. In some embodiments, the auxiliary power generation unit comprises a buck converter and a Schottky diode.

In some embodiments, at least two of the driver units are isolated driver units configured to create a virtual ground for two corresponding ones of the ideal diode elements. In some embodiments, each isolated driver unit comprises an opto-coupler connected to the corresponding ideal diode element and a resistor between the controller and the opto-coupler.

In accordance with another broad aspect, there is provided a method for driving a rectifying circuit that converts an alternating current (AC) input voltage from a source to a direct current (DC) output voltage for delivery to a load. the method comprises acquiring measurements for a current flowing across the load and a phase of the source; determining, from the measurements, corresponding conducting settings for four ideal diode elements connected in a bridge configuration; and outputting at least one control signal to cause driver units connected to the ideal diode elements to drive the ideal diode elements in accordance with the corresponding conducting settings.

In some embodiments, acquiring measurements for a phase of the source comprises measuring a line voltage of the source and a neutral voltage of the source and determining a phase difference between the line voltage and the neutral voltage.

In some embodiments, acquiring measurements comprises determining if the line voltage is high or zero, and determining if the neutral voltage is high or zero.

In some embodiments, acquiring measurements comprises determining if the current flowing across the load is above a predetermined minimum value.

In some embodiments, acquiring measurements comprises sampling values for a predetermined duration and/or a predetermined number of times.

In some embodiments, a first conducting setting corresponds to having a first pair of the ideal diode elements conducting while a second pair of the ideal diode elements are non-conducting, and a second conducting setting corresponds to having the second pair conducting while the first pair is non-conducting.

In some embodiments, a third conducting setting comprises having all of the ideal diode elements non-conducting.

In some embodiments, the first conducting setting corresponds to a line voltage of high, a neutral voltage of high, a current voltage of high, and a phase difference of 180 degrees between the line voltage and the neutral voltage.

In some embodiments, the second conducting setting corresponds to a line voltage of low, a neutral voltage of high, a current voltage of high, and a phase difference of 180 degrees between the line voltage and the neutral voltage.

In some embodiments, acquiring measurements for a current flowing across the load comprises sensing a voltage across a resistor provided in a path between the load and the source.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1A:
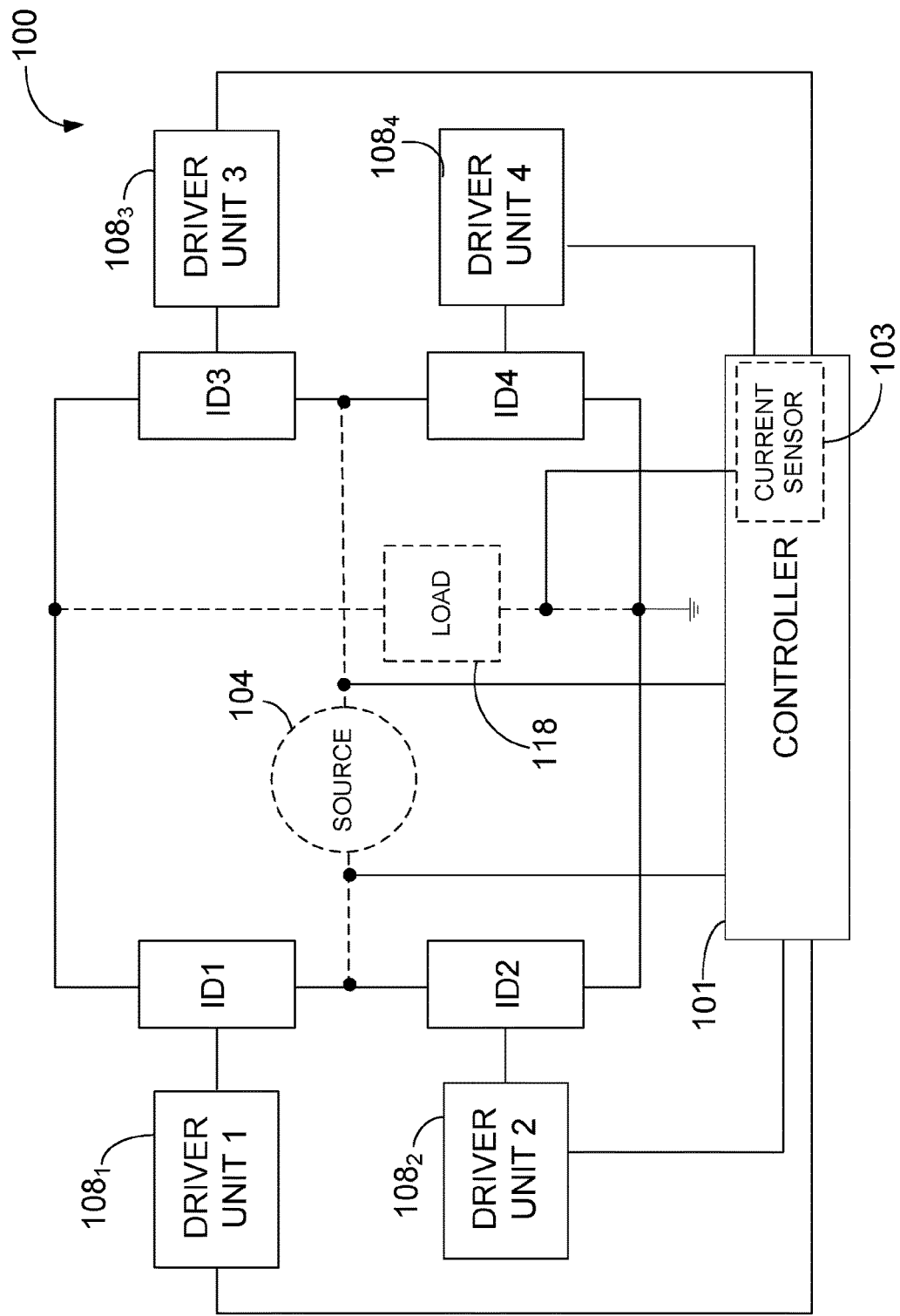
FIG. 1A is a schematic diagram illustrating an exemplary embodiment of an ideal diode full bridge rectifier, in accordance with one embodiment.

FIG. 1A illustrates a rectifying circuit 100. The rectifying circuit 100 comprises four (4) ideal diode elements ID1, ID2, ID3, ID4 connected in a bridge configuration. The bridge may be a half-bridge or a full-bridge. The rectifying circuit 100 further comprises four (4) driver units $108_1$, $108_2$, $108_3$, $108_4$ which are connected to a corresponding one of the ideal diode elements ID1, ID2, ID3, ID4. The driver units $108_1$, $108_2$, $108_3$, $108_4$ are each used to control the "ON-OFF" transition of a corresponding diode element ID1, ID2, ID3, ID4 in order to cause each diode element ID1, ID2, ID3, ID4 to conduct or not conduct, as desired.

A controller 101 is connected to each driver unit $108_1$, $108_2$, $108_3$, $108_4$. The controller 101 is also connected to a load 118 for measuring a current flowing through the load 118. A current sensor 103 is provided in the controller 101 for this purpose. The current sensor 103 may be implemented in various ways, such as using a sensing resistor, a transformer or current clamp meter, a Hall effect sensor, and the like. The controller 101 is also connected across a source 104 to measure a phase of the source 104. Using these measurements, the controller 101 is configured for determining conduction settings for the ideal diode elements $102_1$, $102_2$, $102_3$, and $102_4$ and outputting one or more control signals to the driver units $108_1$, $108_2$, $108_3$, $108_4$. The control signals cause the driver units $108_1$, $108_2$, $108_3$, $108_4$ to conduct the ideal diode elements $102_1$, $102_2$, $102_3$, and $102_4$ in accordance with the conducting settings in order to convert an Alternating Current (AC) input voltage from the source 104 into a direct current (DC) output voltage, for delivery to the load 118.

The ideal diode elements ID1, ID2, ID3, ID4 may be, for example, implemented with metal-oxide-semiconductor field-effect transistors (MOSFETs). In one embodiment, the MOSFETs are standard MOSFETs with low RDS-ON. In another embodiment, the MOSFETs are Gallium Nitride (GaN) MOSFETs with high performance. Other configurations may apply. Each MOSFET acts like a perfect conductor when voltage is applied forward biased and like a perfect insulator when voltage is applied reverse biased. The MOSFETs are connected in such a way as to conduct in opposing pairs, whereby each pair is conductive as a function of the polarity of the applied voltage. In one embodiment, the AC source 104 supplies a voltage ranging between 85 Vac and 264 Vac, as measured between the line and neutral conductors.

Figure 1B:
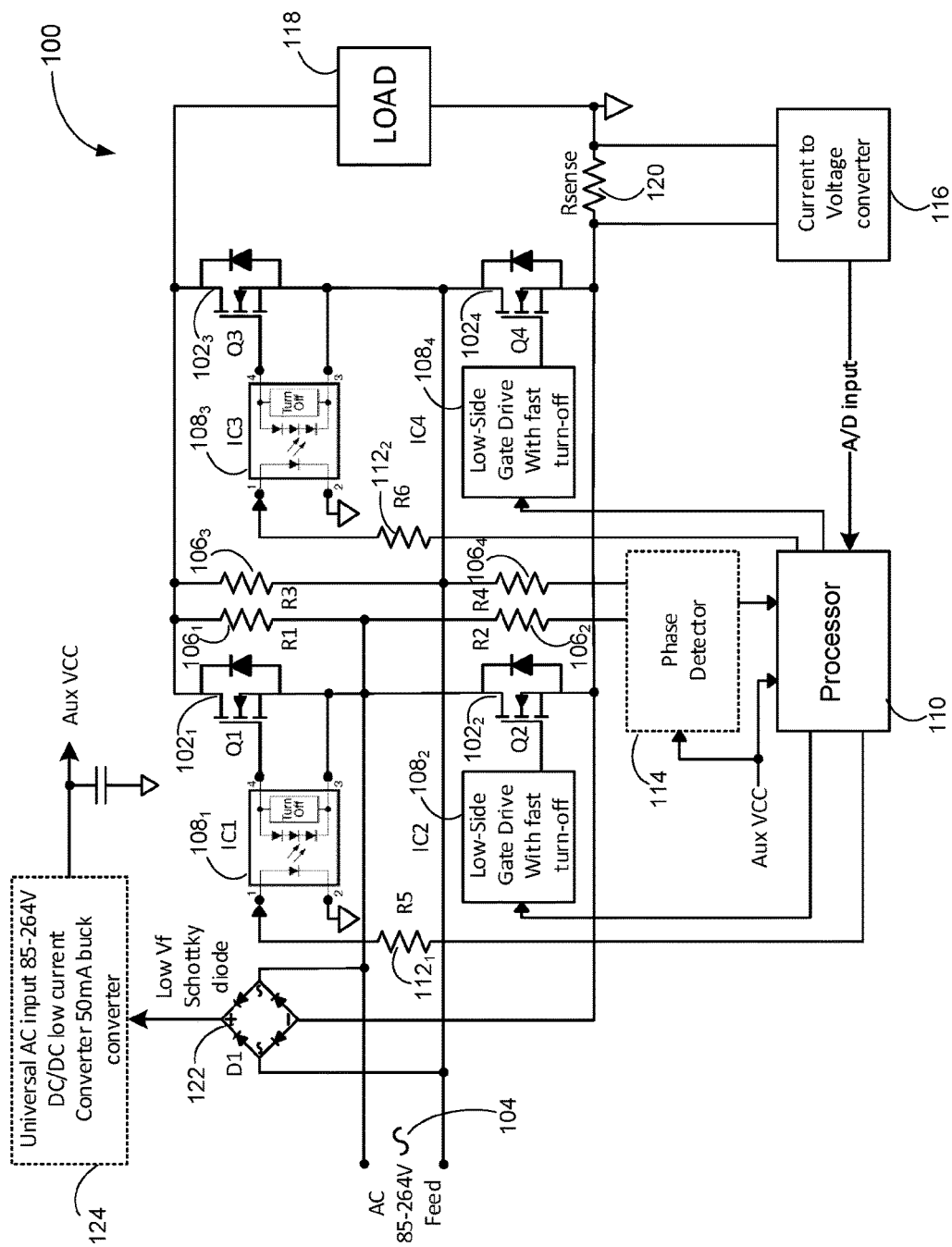
FIG. 1B is a detailed example of the rectifier of FIG. 1A.

FIG. 1B is a more detailed example of the rectifying circuit 100, as implemented using MOSFETs $102_1$, $102_2$, $102_3$, $102_4$ as the ideal diode elements ID1, ID2, ID3, ID4. The circuit 100 comprises resistors $106_1$, $106_2$, $106_3$, and $106_4$ each connected to the drain of a corresponding MOSFET $102_1$, $102_2$, $102_3$, $102_4$. In particular, resistor $106_1$ is connected between the drain of MOSFET $102_1$ and the drain of MOSFET $102_2$, resistor $106_2$ is connected to the drain of MOSFET $102_2$, resistor $106_3$ is connected between the drain of MOSFET $102_1$ and the drain of MOSFET $102_4$, and resistor $106_4$ is connected to the drain of MOSFET $102_4$. The resistors $106_1$, $106_2$, $106_3$, and $106_4$ respectively have a resistance of R1, R2, R3, and R4. The four driver units $108_1$, $108_2$, $108_3$, $108_4$ are composed of Integrated Circuits (IC) to drive the MOSFETs $102_1$, $102_2$, $102_3$, or $102_4$ and limit their gate voltage to obey the MOSFETs' maximum gate-to-source voltage ($V_{GS}$) specification, with the usual maximum $V_{GS}$ being about 20V. For this purpose, driver unit $108_1$ is connected between the gate and the source of MOSFET $102_1$, driver unit $108_2$ is connected to the gate of MOSFET $102_2$, driver unit $108_3$ is connected between the gate and the source of MOSFET $102_3$, and driver unit $108_4$ is connected to the gate of MOSFET $102_4$.

The driver units $108_1$, $108_2$, $108_3$, or $108_4$ are in turn controlled by a processor 110, which forms part of the controller 101 and causes a desired conducting behavior of the MOSFETs $102_1$, $102_2$, $102_3$, $102_4$. The processor 110 may be any device that can perform operations on data. Examples are a central processing unit (CPU), a microprocessor, a field programmable gate array (FPGA), or a reconfigurable processor. The controller 110 may also be provided (or be in communication) with a memory (not shown) accessible by the processor 110. The memory may be a main memory, such as a high speed Random Access Memory (RAM), or an auxiliary storage unit, such as a hard disk, flash memory, or a magnetic tape drive. The memory may be any other type of memory, such as a Read-Only Memory (ROM), Erasable Programmable Read-Only Memory (EPROM), electrically-erasable programmable read-only memory (EEPROM), Ferroelectric RAM (FRAM), or optical storage media such as a videodisc and or a compact disc.

In the embodiment of FIG. 1B, the MOSFETs $102_2$ and $102_4$ are referenced to the same potential as the processor 110. Therefore, the MOSFETs $102_2$ and $102_4$ do not need any insulation to create a virtual ground. As such, the driver units $108_2$ and $108_4$, which are respectively used to drive the MOSFETs $102_2$ and $102_4$ may be implemented using standard (or "off-the-shelf") gate drivers not requiring a virtual ground. Driver units $108_2$ and $108_4$ may comprise discrete components, such as transistors, resistors, and diodes. Other configurations may also apply.

Due to the position of MOSFETs $102_1$ and $102_3$ in the upper section of the rectifying circuit 100, the reference point for MOSFETs $102_1$ and $102_3$ is the same as for the AC input 104. Virtual grounding is therefore provided for MOSFETs $102_1$ and $102_3$. In one embodiment, virtual grounding is created for MOSFETs $102_1$ and $102_3$ by implementing driver unit $108_1$ and $108_3$ with opto-couplers. Resistors $112_1$ and $112_2$, which are provided in the electrical path from the processor 110 to the opto-couplers, can then be used to activate each driver unit's opto-coupler diodes. The resistors $112_1$ and $112_2$ respectively have resistances R5 and R6 and are used to limit (e.g. to 10 mA) the current flowing to driver units $108_1$ and $108_3$. In another embodiment, the virtual grounding may be created by providing a transformer driven by processor 110. Other configurations may apply.

Still referring to FIG. 1B, in one embodiment, the driver units $108_1$ and $108_3$ as well as the driver units $108_2$ and $108_4$ are also designed with a fast turn-off technology that avoids having two MOSFETs on the same leg switched "ON" at the same time. In this manner, short circuits can be prevented and the Miller effect is reduced. The processor 110 is connected to a phase detector unit 114 and to a current to voltage converter 116, also part of the controller 101. The rectifying circuit 100 may further comprise a low loss diode 122 and a universal DC-DC conversion module 124, which are connected to the input source 104 and form an auxiliary power generation unit. The diode 122 may be a low voltage Schottky diode while the DC-DC conversion module 124 may be a 50 mA buck converter. Other configurations may apply. The diode 122 is used together with the conversion module 124 to generate auxiliary power (referred to as "Aux VCC" in FIG. 1B) that is used to power local electronics (e.g. the processor 110 and the phase detector unit 114).

Figure 2:
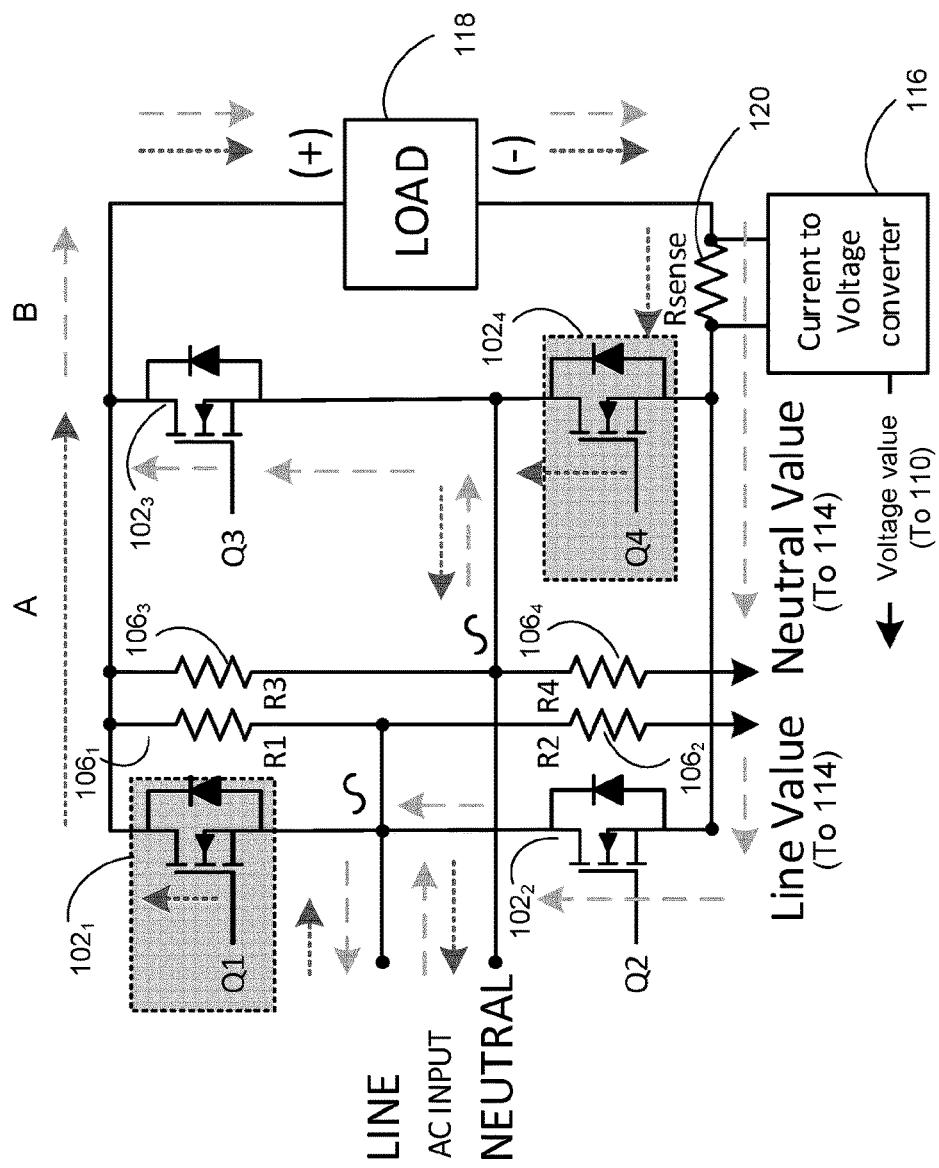
FIG. 2 is a schematic diagram detailing the ideal diode bridge configuration of FIG. 1.

Referring to FIG. 2, the phase detector unit 114 receives a first voltage (referred to as "Line Value" in FIG. 2) obtained from a first voltage divider created by the series connection of resistors $106_1$ and $106_2$, with the upper terminal (referred to as "Line" in FIG. 2) of the AC input source 104 connected at the node connecting resistors $106_1$ and $106_2$. This voltage is referred to as Line Voltage in Table 1 below. The phase detector unit 114 also receives a second voltage (referred to as "Neutral Value" in FIG. 2) obtained from a second voltage divider created by the series connection of resistors $106_3$ and $106_4$, with the lower terminal (referred to as "Neutral" in FIG. 2) of the AC input source 104 connected at the node connecting resistors $106_3$ and $106_4$. This voltage is referred to as Neutral Voltage in Table 1 below.

From the received voltages, the phase detector unit 114 determines the phase of the AC input source 104 (i.e. the phase difference between the line and neutral signals) and feeds the phase information (along with the values of the line and neutral voltages) to the processor 110. The processor 110 then uses the phase information to determine when to switch the MOSFETs $102_1$, $102_2$, $102_3$, $102_4$. Because the line and neutral signals have the same frequency but are out of phase by 180 degrees, the phase shift between the line and neutral signals is detected at a zero-crossing of the line and neutral voltages. Thus, when the processor 110 detects the 180 degree phase shift, it concludes that a zero crossing of the AC input voltage signal has occurred. The processor 110 then determines the applicable conducting settings and outputs one or more control signals to the driver units $108_1$, $108_2$, $108_3$, $108_4$ for causing the proper group of MOSFETs $102_1$, $102_2$, $102_3$, $102_4$ to be switched in accordance with the conducting settings. Table 1 illustrates an example of conducting settings for MOSFET operation as a function of load current and source phase measurements.

TABLE 1

| Line Voltage | Neutral Voltage | Current Voltage | Phase between Line and Neutral | MOSFET |
|---|---|---|---|---|
| HIGH | HIGH | HIGH | 180 Degree | Q1, Q4: ON (Active), Q2, Q3: OFF (Inactive) |
| LOW | HIGH | HIGH | 180 Degree | Q2, Q3: ON (Active), Q1, Q2: OFF (Inactive) |
| | | | Any other value | Q1, Q2, Q3 and Q4: OFF (inactive) |

Upon switching of the MOSFETs $102_1$, $102_2$, $102_3$, $102_4$, energy flows towards the load 118, to which a direct current (DC) of positive polarity is provided. In order to ensure that the energy flow remains in a single direction, e.g. from the main input source 104 to the load 118, a resistor 120 (having resistance Rsense) is included in the path between the AC input source 104 and the load 118. Resistor 120 may be used as the current sensor 103, for monitoring the current that flows into the load 118. For this purpose, the current to voltage converter 116, which is connected to the terminals of the resistor 120, measures the voltage drop across resistor 120. The voltage measured by the current to voltage converter 116 is then sent to the processor 110. An Analog-to-Digital Converter (ADC) (not shown) may be provided inside the controller 101 for sensing the voltage measured by the current to voltage converter. The processor 110 then converts (using Ohm's law and having knowledge of the value of the resistance Rsense) the measured voltage into a current value representative of the current flowing through the resistor 120. This in turns provides an indication of the current flowing into the load 118.

In one embodiment, a memory, provided either inside the controller 101 or separately therefrom, has stored therein the conducting settings, which define which MOSFETs $102_1$, $102_2$, $102_3$, $102_4$ should be switched "ON" or "OFF". The processor 110 may therefore, upon receiving input data from the phase detector unit 114 and the current to voltage converter 116, query the memory to determine the conducting settings that are applicable given the status of the sensed values (line voltage, neutral voltage, Rsense Voltage, phase between line and neutral). When the voltage drop (Rsense Voltage) through the resistor 120 (as determined at the current to voltage converter 116), and accordingly the current flowing through resistor 120, is positive (referred to as "high" in Table 1), the processor 110 causes selected ones of the MOSFETs $102_1$, $102_2$, $102_3$, $102_4$ to be turned "ON". In particular, when the Rsense voltage is "high", the line voltage (as detected at the phase detector 114) is "high", the neutral voltage (as detected at the phase detector 114) is "high", and the phase between line and neutral is 180 degrees, the processor 110 switches MOSFETs $102_1$ and $102_4$ "ON" (i.e. activated or conducting) and MOSFETs $102_2$ and $102_3$ "OFF" (i.e. de-activated or non-conducting). In particular, when the line voltage is high, current flows from the line conductor through the body diode of MOSFET $102_1$, then through the load 118, and through the body diode of MOSFET $102_4$ back to the neutral conductor. The gate-to-source voltage of each MOSFET $102_1$ and $102_4$ then becomes greater than the turn-on threshold, causing the MOSFETs $102_1$ and $102_4$ to turn on. This is illustrated in FIG. 2 by arrows A, which show the direction of the line current when the line voltage is high. It can be seen that the line current flows through MOSFETs $102_1$ and $102_4$ but not through MOSFETs $102_2$ and $102_3$.

When the phase between line and neutral is 180 degrees, the Rsense voltage and the neutral voltage are "high", and the line voltage is "low" (where it should be understood that, in order to ensure that the load current flows in a single direction, from positive to negative, only the neutral voltage can illustratively transition between "high" and "low" values), the processor 110 switches MOSFETs $102_2$ and $102_3$ "ON" and MOSFETs $102_1$ and $102_4$ "OFF". When the neutral voltage is high, current flows from the neutral conductor through the body diode of MOSFET $102_3$, then through the load 118, and through the body diode of MOSFET $102_2$ back to the line conductor, causing the MOSFETs $102_2$ and $102_3$ to turn on. This is illustrated in FIG. 2 by arrows B, which show the direction of the line current when the line voltage is low. It can be seen that the line current flows through MOSFETs $102_2$ and $102_3$ but not through MOSFETs $102_1$ and $102_4$. This results in rectification of the DC output by ensuring a positive polarity DC output voltage.

For any other values of the line voltage, the neutral voltage, the Rsense Voltage, and the phase between line and neutral, the processor 110 causes the MOSFETs $102_1$, $102_2$, $102_3$, $102_4$ to be turned "OFF". For example, as discussed above, the MOSFETs $102_1$, $102_2$, $102_3$, $102_4$ are turned "OFF" when the Rsense voltage reaches zero volts (i.e. is "low"). In one embodiment, at 120V RMS, a voltage of about 60V is referred to as "high" and a voltage of about −60V is referred to as "low" whereas, at 240V RMS, a voltage of about 120V is referred to as "high" and a voltage of about −120V is referred to as "low".

Illustratively, before switching any MOSFET $102_1$, $102_2$, $102_3$, or $102_4$ "ON" or "OFF", the processor 110 validates (e.g. samples) a predetermined number of times the input data (e.g. the voltage values and the phase information) it receives from the current to voltage converter 116 and the phase detector 114. This avoids false switching and makes the system less vulnerable to noise and malfunctions. In one embodiment, the processor 110 validates the input data five (5) times before causing switching of the MOSFETs $102_1$, $102_2$, $102_3$, $102_4$. It should be understood that, depending on the applications, sampling values other than five (5) may apply.

Figure 3:
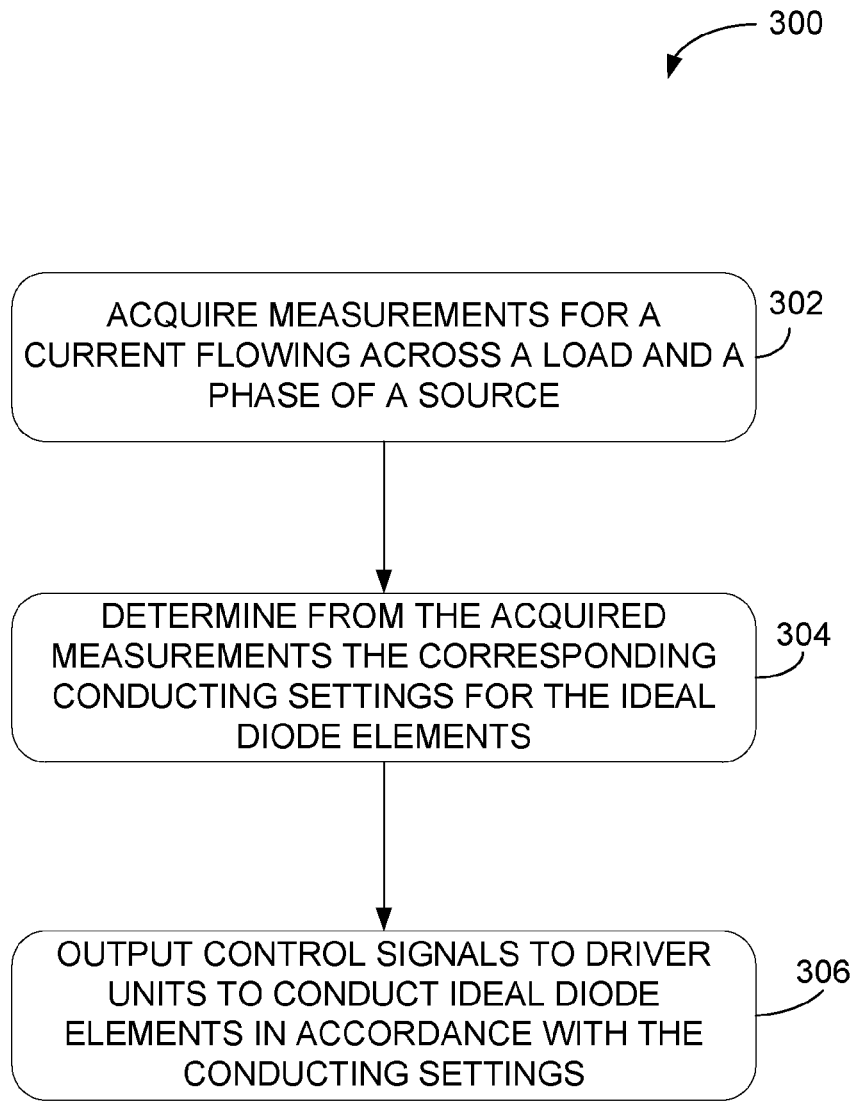
FIG. 3 is a flowchart of a method for driving an ideal diode bridge rectifier, in accordance with one embodiment.

Referring now to FIG. 3, a method 300 for driving a rectifying circuit 100 will now be described. The method 300 may be implemented at the controller 101 of circuit 100. At step 302, measurements are acquired for the load current and the phase of the source. At step 304, corresponding conducting settings for the ideal diode elements are determined from the load current and source phase. At step 306, at least one control signal is output to cause the driver units connected to the ideal diode elements to conduct the ideal diode elements in accordance with the corresponding conducting settings.

Figure 4:
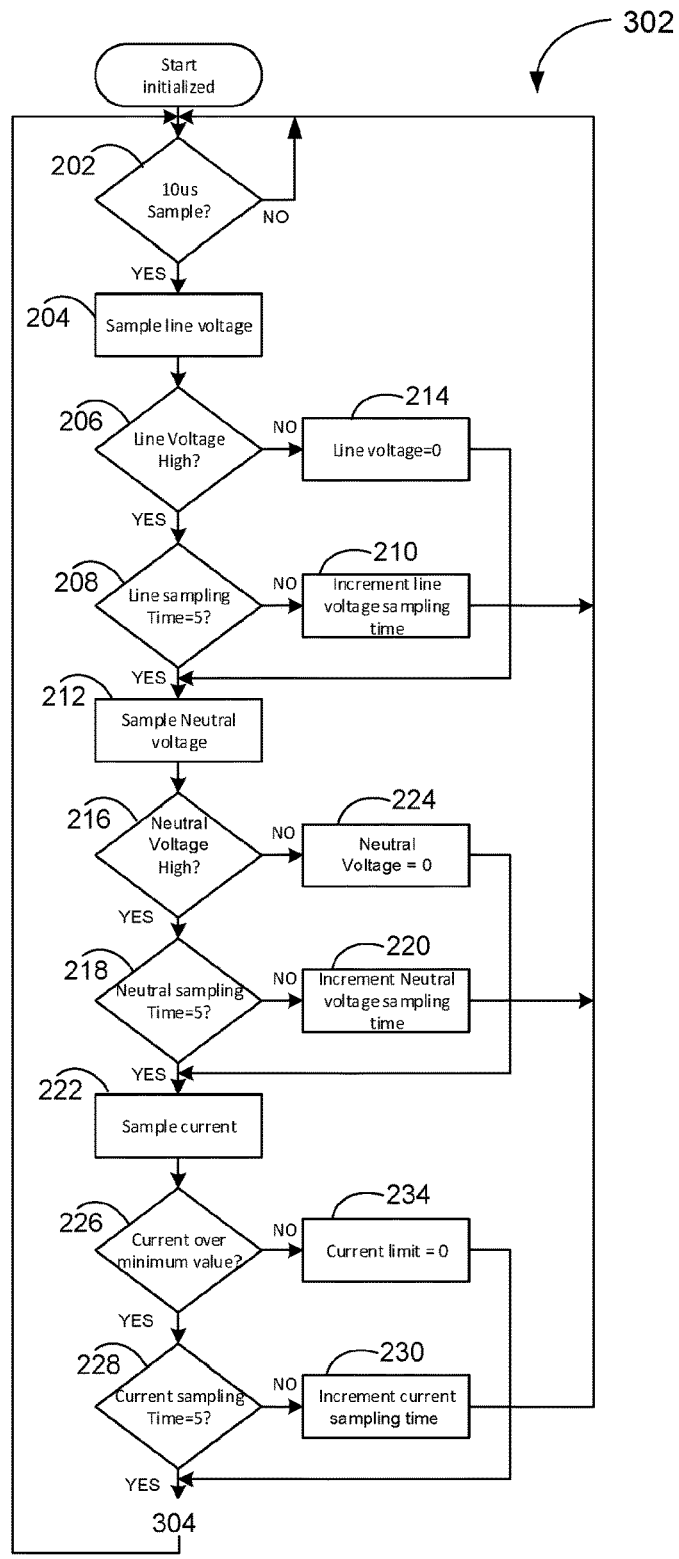
FIG. 4 is an example embodiment for a step of the method of FIG. 3.

FIG. 4 is an example embodiment of a method for performing step 302. The method comprises assessing at step 202 whether samples (e.g. voltage and current sample values) have been acquired for a predetermined duration, e.g. 10 μs, and/or a predetermined number of samples have been acquired. Indeed, the controller 101 is illustratively configured to sample data a predetermined number of times (e.g. five (5) times), as discussed above, over a predetermined conversion timeframe. The values of the conversion timeframe and the number of sampling times may be stored in memory. This sampling allows to ensure that the value of the sampled data is accurate and that the rectifier's MOSFETs are switched at a proper time. If, after having sampled the data a predetermined number of times over the predetermined timeframe, it is determined that all sampled values are the same, it can be concluded that the sampled data is indeed accurate. If it is determined at step 202 that the data has not been sampled for the given duration, the method 302 starts again and repeats step 202 until the data has been sampled for the desired duration.

Once it is determined at step 202 that the data has been sampled for the given duration, the line voltage is sampled at step 204. The next step 206 is then to assess whether the line voltage is high (i.e. positive). If this is the case, it is assessed at step 208 whether the line sampling time is equal to the predetermined duration and/or whether the predetermined number of samples have been obtained. As discussed above, this avoids false switching by ensuring that data (e.g. the line voltage, neutral voltage, load current) has been sampled a predetermined number (e.g. five (5)) of times. If it is determined at step 208 that the line voltage has not yet been sampled, for example, five (5) times, the next step 210 is to increment the line voltage sampling time in order to cause more line voltage sampling values to be acquired when step 204 is repeated. The method 302 then flows back to step 202. Otherwise, if it is determined at step 208 that the line voltage has been sampled five (5) times, the next step 212 is to sample the neutral voltage. Step 212 is also performed after it is determined at step 206 that the line voltage is not high and it has therefore been concluded at step 214 that the line voltage is equal to zero volts, since the line voltage can only be high or zero volts at the time it is sampled.

After step 212 is performed, the next step 216 is to assess whether the neutral voltage is high. If this is the case, it is assessed at step 218 whether the neutral voltage sampling time is equal to, for example, five (5). If this is not the case, the next step 220 is to increment the neutral voltage sampling time in order to cause more neutral voltage sampling values to be acquired when step 212 is repeated. The method 302 then flows back to step 202. Otherwise, if it is determined at step 218 that the neutral voltage has been sampled five (5) times, the next step 222 is to sample the current flowing towards the load 118, i.e. obtain the voltage drop through the sense resistor 120 from the current to voltage converter 116 and determine therefrom sample values for the current flowing through resistor 120. Step 222 is also performed after it is determined at step 216 that the neutral voltage is not high and it has therefore been concluded at step 224 that the neutral voltage is equal to zero volts.

After the current has been sampled at step 222, it is assessed whether the sampled current is over a predetermined minimum value. In one embodiment, the minimum value of the current flowing through the sense resistor 120 is about 40 mA. If this is the case, the next step 228 is to determine whether the current sampling time is equal to, for example, five (5). If this is not the case, the next step 230 is to increment the current sampling time in order to cause more current sampling values to be acquired when step 222 is repeated. The method 302 then flows back to step 202. Otherwise, if it is determined at step 228 that the current has been sampled five (5) times, the method 302 proceeds to step 231. Step 231 is also performed after it is determined at step 226 that the sampled current is not over the predetermined minimum value and it has therefore been concluded at step 234 that the sampled current is equal to zero volts.

Note that while the method 302 has been presented as following a measurement order of line voltage, followed by neutral voltage, followed by load current, a different order may be used. For example, the load current may first be measured, followed by the line voltage, followed by the neutral voltage. Also alternatively, the load current may be measured concurrently with the line voltage and/or neutral voltage. It will be understood that if a different order is used, the method 302 may be adapted using the different order.

Figure 5:
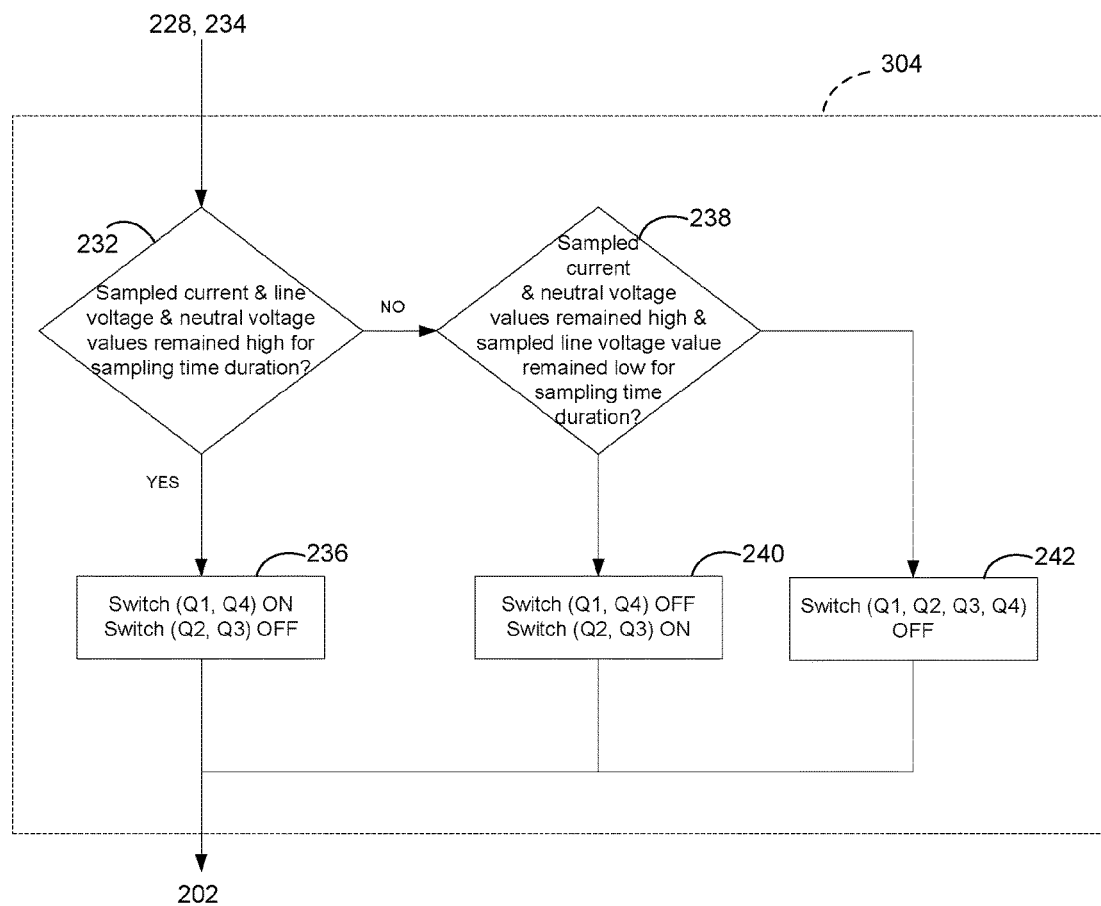
FIG. 5 is an example embodiment for another step of the method of FIG. 3.

Referring to FIG. 5, there is illustrated an example embodiment for step 304. The method comprises determining, at step 232, whether the values of the sampled current (obtained at step 222 of FIG. 4), the sampled line voltage (obtained at step 204 of FIG. 4), and the sampled neutral voltage (obtained at step 212 of FIG. 4) have remained high for the duration of the sampling timeframe (i.e. for five (5) sampling times). If it is determined at step 232 that the sampled values indeed remained high for the sampling time duration, the next step 236 is to find the corresponding conducting settings, which are MOSFETs $102_1$ and $102_4$ of FIG. 1 (referred to as Q1 and Q4) "ON" and MOSFETs $102_2$ and $102_3$ of FIG. 1 (referred to as Q2 and Q3) "OFF".

If it is determined at step 232 that the sampled values did not remain high for the sampling time duration, the next step 238 is to assess whether the values of the sampled current and the sampled neutral voltage have remained high for the sampling time duration and the value of the sample line voltage remained low for the sampling time duration. If this is the case, the next step 240 is to find the corresponding conducting settings, which are MOSFETs $102_2$ and $102_3$ (referred to as Q2 and Q3) "ON" and MOSFETs $102_1$ and $102_4$ (referred to as Q1 and Q4) "OFF". Otherwise, if it is determined at step 238 that it is not true that sampled current and the sampled neutral voltage have remained high for the sampling time duration and the value of the sample line voltage has remained low for the sampling time duration, the next step 242 is to find the corresponding conducting settings, which are MOSFETs $102_1$, $102_2$, $102_3$, $102_4$ "OFF". After steps 236, 240, or 242 have been performed, the method 302 flows back to step 202.

Similarly to the method 302 of FIG. 4, the method 304 of FIG. 5 may also be performed using a different sequencing order. For example, it may first be determined whether the sampled current and neutral voltage values remained high and the sampled line voltage value remained low for the sampling time duration, as per step 238, followed by a determination of whether the sampled current, neutral voltage, and line voltage values remained high for the sampling time duration. One or more of the determinations may be performed concurrently, or they may all be performed sequentially.

Using the proposed circuit and method discussed herein, the MOSFETs $102_1$, $102_2$, $102_3$, $102_4$ can be switched in a secure and efficient manner and are prevented from being used in a saturation mode. In particular, by isolating MOSFETs $102_1$ and $102_3$ (e.g. using optocouplers provided in the driver units $108_1$ and $108_3$), it becomes possible to activate the MOSFETs while ensuring that the gate-to-source voltage ($V_{GS}$) experienced by any individual MOSFET is limited and the MOSFETs' maximum gate-to-source voltage specification (e.g. 20V) is adhered to. As such, using the proposed rectifier architecture, the primary limitation on the applied voltage input by the source 104 becomes the MOSFETs' drain-to-source breakdown voltage ($BV_{DS}$) rating (i.e. the maximum specified drain to source voltage the MOSFETs are designed to withstand and beyond which breakdown may occur). In this manner, it becomes possible to increase the input voltage from the gate-to-source voltage ($V_{GS}$) to the drain-to-source breakdown voltage. This proves especially useful for voltage applications that are higher than 20 volts.

It should be noted that the present invention can be carried out as a method, can be embodied in a system, and/or on a non-transitory computer readable medium. The embodiments of the invention described above are intended to be exemplary only. The scope of the invention is therefore intended to be limited solely by the scope of the appended claims.

The invention claimed is:

1. A rectifying circuit for converting an alternating current (AC) input voltage from a source to a direct current (DC) output voltage for delivery to a load, the rectifying circuit comprising:
   four ideal diode elements connected in a bridge configuration, the four ideal diode elements are metal-oxide-semiconductor field-effect transistors (MOSFETs);
   four driver units, each one of the driver units connected to a corresponding one of the ideal diode elements and configured to drive the corresponding one of the ideal diode elements;
   four resistors R1, R2, R3, R4, each one of the four resistors connected to a drain of a corresponding one of the MOSFETs; and
   a controller comprising:
      a processor connected to the driver units;
      a phase detector connected to a voltage divider formed from resistors R1 and R2, and a voltage divider formed from resistors R3 and R4, and connected to the processor;
      a resistor Rsense in a path between the load and the source; and
      a current to voltage converter connected across the resistor Rsense and to the processor, and the controller configured for:
         acquiring a current measurement flowing across the load and a phase measurement of the source;
         determining, from the current measurement and the phase measurement, corresponding conducting settings for the four ideal diode elements; and
         outputting at least one control signal to cause the driver units to drive the ideal diode elements in accordance with the corresponding conducting settings.

2. The rectifying circuit of claim 1, wherein the four ideal diode elements are connected in a full-bridge configuration.

3. The rectifying circuit of claim 1, wherein the MOSFETs are Gallium Nitride MOSFETs.

4. The rectifying circuit of claim 1, further comprising an auxiliary power generation unit for powering the controller.

5. The rectifying circuit of claim 4, wherein the auxiliary power generation unit comprises a buck converter and a Schottky diode.

6. The rectifying circuit of claim 1, wherein at least two of the four driver units are isolated driver units configured to create a virtual ground for two corresponding ones of the ideal diode elements.

7. The rectifying circuit of claim 6, wherein each isolated driver unit of the at least two of the four driver units comprises an optocoupler connected to the corresponding ideal diode element and a resistor between the controller and the optocoupler.

8. A method for driving a rectifying circuit that converts an alternating current (AC) input voltage from a source to a direct current (DC) output voltage for delivery to a load, the method comprising:
   acquiring measurements for a current flowing across the load and a phase of the source comprising measuring a line voltage of the source and a neutral voltage of the source and determining a phase difference between the line voltage and the neutral voltage;
   determining, from the measurements, corresponding conducting settings for four ideal diode elements connected in a bridge configuration; and
   outputting at least one control signal to cause driver units connected to the four ideal diode elements to drive the ideal diode elements in accordance with the corresponding conducting settings.

9. The method of claim 8, wherein acquiring measurements for the current flowing across the load and a phase of the source comprises determining if the line voltage is high or zero, and determining if the neutral voltage is high or zero.

10. The method of claim 8, wherein acquiring measurements for the current flowing across the load and the phase of the source comprises determining if the current flowing across the load is above a predetermined minimum value.

11. The method of claim 8, wherein acquiring measurements for the current flowing across the load and the phase of the source comprises sampling values at least one of for a predetermined duration and a predetermined number of times.

12. The method of claim 8, wherein a first conducting setting corresponds to having a first pair of the ideal diode elements conducting while a second pair of the ideal diode elements are non-conducting, and a second conducting setting corresponds to having the second pair conducting while the first pair is non-conducting.

13. The method of claim 12, wherein a third conducting setting comprises having all of the ideal diode elements non-conducting.

14. The method of claim 12, wherein the first conducting setting corresponds to a line voltage of high, a neutral voltage of high, a current voltage of high, and a phase difference of 180 degrees between the line voltage and the neutral voltage.

15. The method of claim 12, wherein the second conducting setting corresponds to a line voltage of low, a neutral voltage of high, a current voltage of high, and a phase difference of 180 degrees between the line voltage and the neutral voltage.

16. The method of claim 8, wherein acquiring measurements for the current flowing across the load and the phase of the source comprises sensing a voltage across a resistor provided in a path between the load and the source.

* * * * *